US005528870A

United States Patent [19]
Zamerovsky

[11] Patent Number: 5,528,870
[45] Date of Patent: Jun. 25, 1996

[54] FRAMED STRUCTURE WITH LOAD-BEARING JOINTS

[76] Inventor: Edward Zamerovsky, 12 Geranium Rd., Levittown, Pa. 19057

[21] Appl. No.: 455,157

[22] Filed: May 31, 1995

Related U.S. Application Data

[62] Division of Ser. No. 180,480, Jan. 12, 1994, Pat. No. 5,469,678, which is a continuation of Ser. No. 539,124, Jun. 18, 1990, abandoned.

[51] Int. Cl.$^6$ .................................................. E04B 1/19
[52] U.S. Cl. .......................... 52/263; 52/585.1; 52/650.3; 52/736.2; 403/231; 403/263
[58] Field of Search ........................ 52/233, 263, 736.2, 52/585.1, 650.3, 648.1, 646; 403/231, 253, 263, 217, 219, 346, 347, 383, 400

[56] References Cited

U.S. PATENT DOCUMENTS

| | | | |
|---|---|---|---|
| 720,623 | 2/1903 | Russel | 403/217 X |
| 1,391,602 | 9/1921 | Abramson | 52/656.9 |
| 2,097,172 | 10/1937 | Yurkovitch | 403/219 |
| 2,317,621 | 4/1943 | McLaughlin, Jr. | 52/648.1 |
| 2,712,199 | 7/1955 | Latimer | 403/217 X |
| 3,966,337 | 6/1976 | Crawford | 403/347 X |
| 4,079,995 | 3/1978 | Beckley | 403/217 X |
| 4,300,455 | 11/1981 | Ornati | 403/231 X |
| 4,360,287 | 11/1982 | Larsson et al. | 403/219 |
| 4,540,308 | 9/1985 | Colby | 403/219 |
| 4,684,282 | 8/1987 | Lever | 403/219 |
| 4,825,620 | 5/1989 | Johnson | 52/646 |

FOREIGN PATENT DOCUMENTS 2307093  8/1974  Germany.

Primary Examiner—Wynn E. Wood
Assistant Examiner—Christopher Todd Kent
Attorney, Agent, or Firm—William H. Eilberg

[57] ABSTRACT

A method of making and erecting a framed structure, preferably single level, by milling standard pieces of lumber that are joined into a sturdy, rectangular frame is disclosed. Opposed Side Beams having dado cuts at their opposite ends are joined to opposed Face Beams having complementary dado cuts at their opposite ends. Floor joists connect opposed sidebeams and support subflooring or decking, and, to accommodate certain larger dimensional floorplans, Center Beams are built into the frame. The frame can rest on a periphery foundation or be erected over posts.

5 Claims, 4 Drawing Sheets

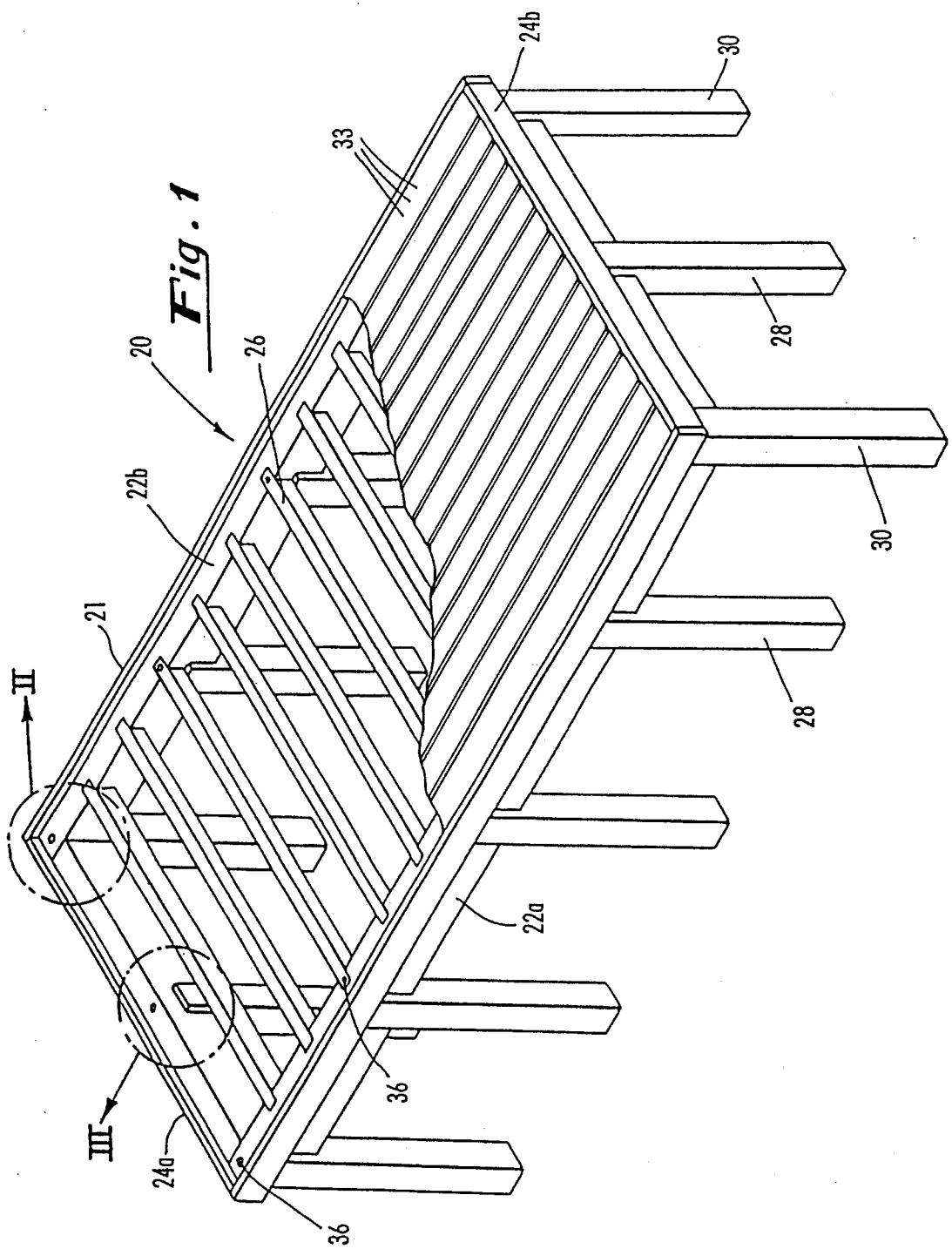

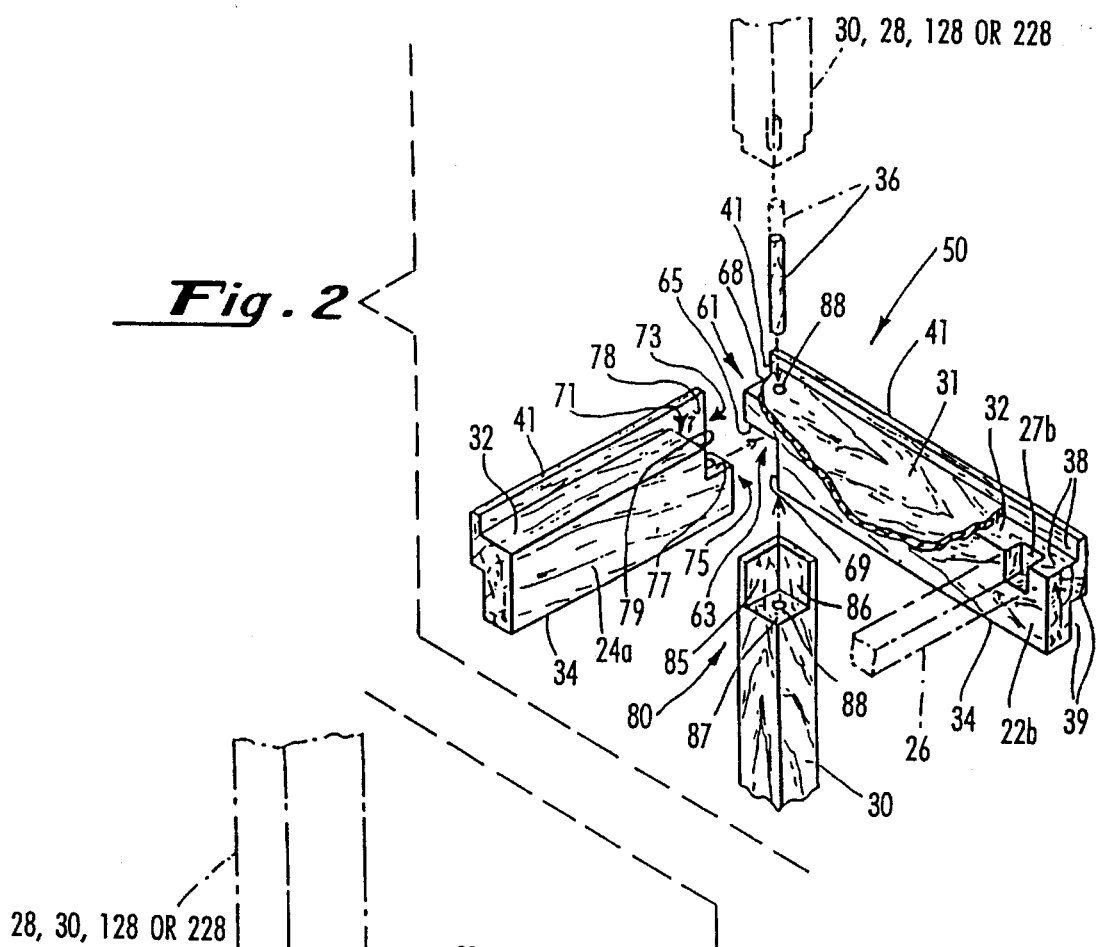

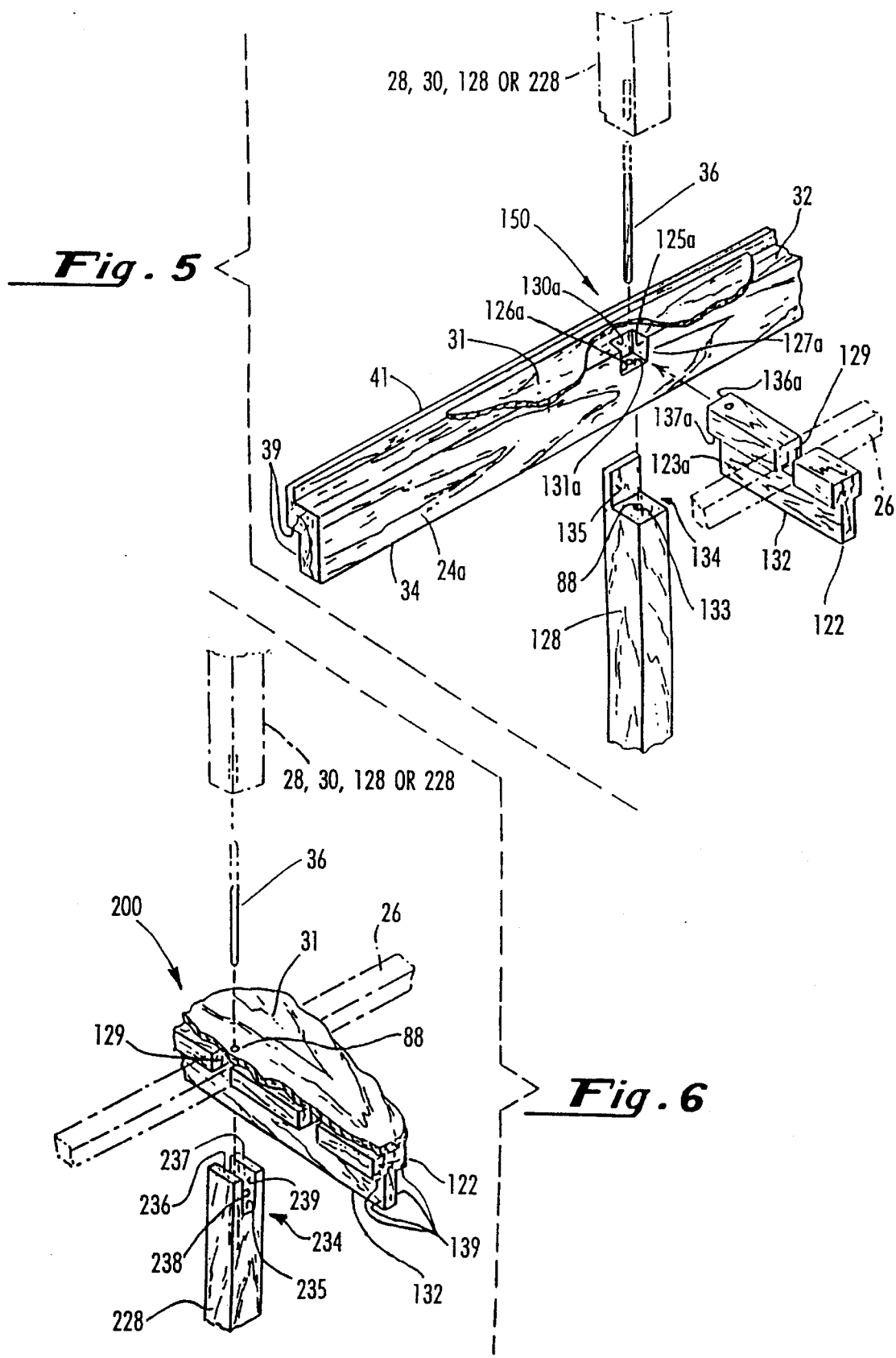

5,528,870

FRAMED STRUCTURE WITH LOAD-BEARING JOINTS

This is a division of application Ser. No. 08/180,480, filed Jan. 12, 1994, now U.S. Pat. No. 5,469,678, which is itself a continuation of application Ser. No. 07/539,124, filed Jun. 18, 1990, now abandoned.

BACKGROUND OF THE INVENTION

The costs of new housing construction have spiralled upward throughout the last years, and many potential buyers of new homes have decided to stay in their current home and simply make additions to the existing structure. One addition that has become popular is to add a deck, or other framed structure, to an existing house. Many popular framed, deck-kits are available to home-owners who wish to follow instructions or there are a number of national or local companies that will not only supply the lumber and hardware, but also build the structure at a desired location.

Of the many popular deck styles currently available, problems with the specific design or the construction techniques needed may cause dissatisfaction with the finished product. One major problem with some kits is that, to finally end up with a well-built and esthetically pleasing structure, a very large number of "finish" pieces must be nailed over the basic skeletal structure, to cover up unsightly joints. This increases the cost of the finished product and of course, with many pieces to use, adds to the time necessary to complete the project. Many designs advertise that load-bearing joints, or where the center of mass of all weight (no matter what the height), rest firmly on and over the foundation, are utilized at the junction of posts and beams, when in fact the construction is only partially load-bearing because the beam is nailed into a cleft the size of the width and depth of the beam on the edge of the post. This construction brings with it a number of structural weaknesses: for instance, in the first place the cleft in a 4"×4" post, for example, is only 1½" in depth and not in the center of the beam. If the post dimensions are 4"×4" (which, in reality is only 3½"×3½"), only 43% of the cross-sectional area of the post provides the support. Also, since nails are put in transverse to the direction of the load, any separation of these members at the cleft will weaken the junction.

Another common practice in current constructed frame decks or additional, framed rooms is to join the joists to the side beams by the common lap joint. Use of this technique, where part of either end of the joist is cut away and these sections are fittingly joined into appropriately sized cut away spaces in the side or facing beams, only provides a partial support at the junction because of the missing sections of both the joist and beam.

SUMMARY OF THE INVENTION

A method of making and erecting a framed deck, or an additional framed room for a house or other structure and the deck or structure so made thereby is claimed. Pre-fabricated members, engineered and made from rectangular-shaped lengths of solid or laminated wood to allow single piece per end and side and having, along their longitudinal dimensions, a plurality of dado-cuts milled in the surface with transverse-oriented notches cut therein and at opposite ends, additional dado cuts therein, are joined to form members of a rectangular frame. Joists are set into opposed notches on the beams and post cavities are cut at opposite ends of the lengths to receive vertical posts. Either decking or sub-flooring is set over the frame to form a horizontal platform and additional stories can be added by setting second or third sets of posts, frame members and joists thereon.

OBJECTS OF THE INVENTION

It is therefore an object of the present invention to provide a new and unique method for forming individual pieces, and erecting a structure therefrom, that will provide strong joints at load-bearing junctures.

It is a further object of the present invention to provide a new technique for erecting a structure that utilizes side and face beams formed to join at corners, that have opposed, mirror-imaged dado cuts therein to give greater strength.

It is a still further object of the present invention to provide uniquely formed beams that are formed together in a frame that gives protection to the edge and butt end of floor boards.

It is still a further object of the present invention to produce a raised deck frame structure with load bearing junctions set upon posts.

These and other objects of the present invention will become apparent after reading the detailed description of the preferred embodiment and appended claims with reference to the attached drawings.

BRIEF DESCRIPTION OF THE DRAWINGS

FIG. 1 is a perspective view of a preferred embodiment of a single-level, raised deck (with the floor boards partially cut-away to reveal corner and floor joist junctions) set upon Corner, Side and Face Posts;

FIG. 2 is an exploded, fragmentary view of a corner junction of the Deck of FIG. 1 showing details of the joined faces of a Side Beam, a Face Beam and a lower-level Corner Post, with an upper-level Corner Post shown in phantom and showing an alternate sub-flooring (shown partially cut-away) installed;

FIG. 3 is an exploded, fragmentary view of a Side or Face Beam junction of the Deck of FIG. 1 showing details of the joined faces of a Face or Side Beam and a lower-level Face and Side Post (with an Upper-level Face and Side Post shown in phantom) and with an alternate sub-flooring (shown partially cut-away) installed;

FIG. 5 is an exploded, fragmentary view of a Side or Face Beam junction of the Deck of FIG. 4 showing details of the joined faces of a Face or Side Beam, a Center Beam and a lower-level Extension Post (with an upper-level Face and Side Post and a floor joist shown in phantom); and FIG. 6 is an exploded, fragmentary view of a Center Beam junction of the Deck of FIG. 4 showing details of the joined faces of a Center Beam and a lower level Center Post (with an upper-level Center Post and floor joist shown in phantom).

DETAILED DESCRIPTION OF THE PREFERRED EMBODIMENT

Figure 4:
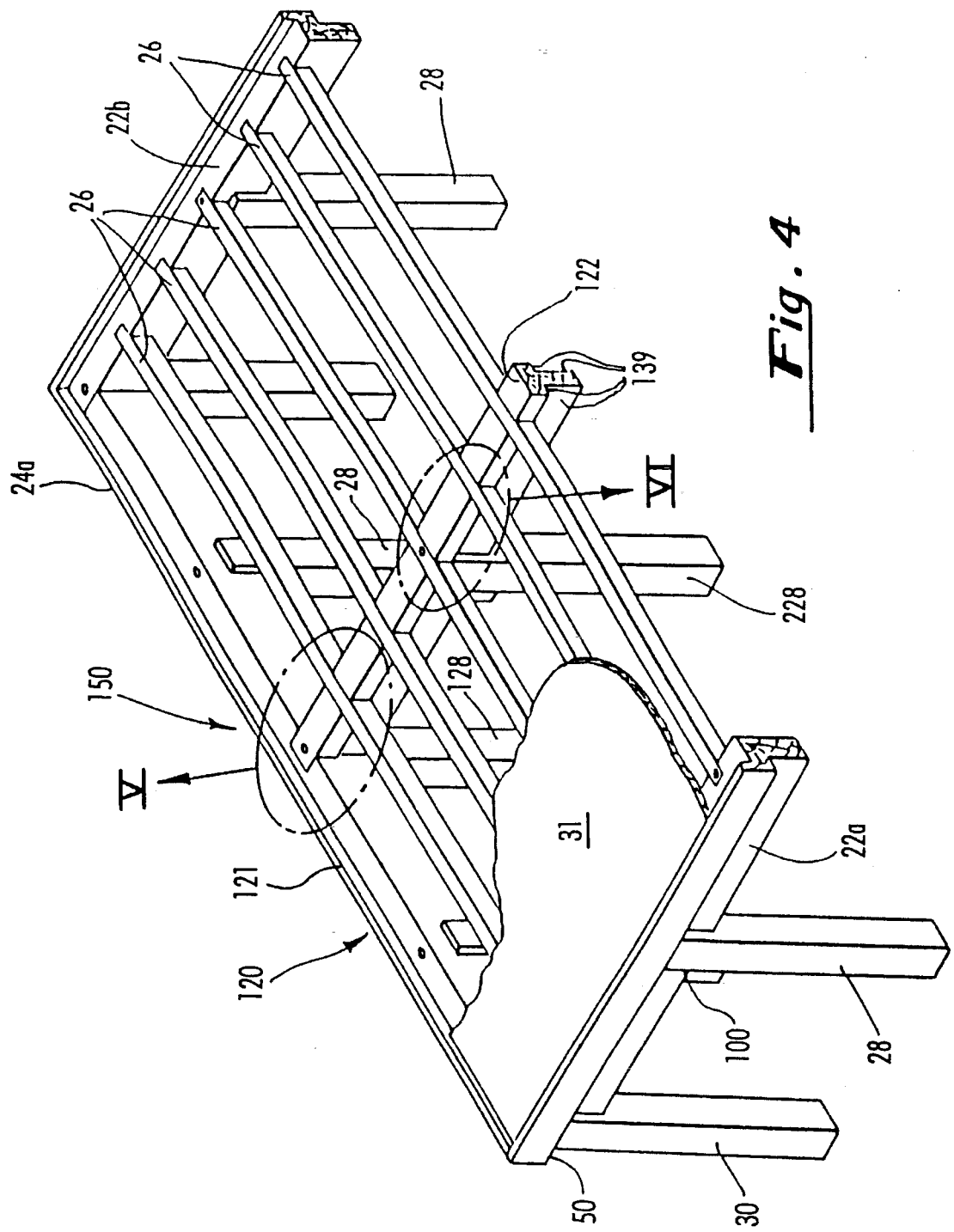
FIG. 4 is a perspective view of an alternate embodiment of the construction of FIG. 1 showing a one-story Deck with an installed sub-flooring (shown partially cut-away)

One embodiment of the present invention is shown as a single level, raised Deck 20 as seen in FIG. 1. Deck 20 is comprised of a frame 21, composed of oppositely-facing Face Beams 22a, b joined at their ends (as will be explained) to oppositely facing Side Beams 24a, b and at their intermediate sections by joists 26, and alternatively, supported by a plurality of Face and Side Posts 28 and Corner Posts 30 with a pin joining the frame to the posts, and covered by a layer, such as decking planks 33 (shown partially cut-away). Depending upon the directions for erection, Deck 20 can have frame 21 atop posts 28, 30 which are themselves fastened into the walls of a foundation (not shown) or frame 21 can be attached directly to a foundation, such as a four-foot footing around the perimeter (also not shown) of the structure. Wooden pegs, or dowels, 36 or similar fastening means are used instead of standard metal nails or screws to fasten selected members together and, as will be explained, certain members are held together by the forces of gravity. The wooden members used to erect Deck 20 can be made from any number of different woods, however where the deck is exposed to elements of the open air the wooden members are preferably natural heartwood cedar or redwood to produce the most fungal-resistant and insect-resistant structure. Each member is formed with a substantially rectangular cross-sectional area throughout its longitudinal dimension until specific cuts or notches are made therein.

FIG. 2 shows an exploded, fragmentary view of a corner junction 50 formed by the combination of the ends of Face Beam 22b and Side Beam 24a with an upper-level post 30 (in phantom). If the framework 21 is to rest on posts, the end of Corner Post 30 is joined thereto, as will be explained. Face Beam 22b, a right Face Beam in FIG. 2, has an initial cross-sectional area that is substantially rectangular, as the beam can be selected from the products found in most mills and lumber yards. The beam is pre-engineered to the design shown by milling a first prespecified dado cut 38, using standard known carpentry techniques, from the top surface of the beam and by milling a second, prespecified dado cut 39 from the bottom surface thereof. After both dado cuts have been made, the resulting structure has a square-edged groove cut into two adjoining surfaces to give a cross-sectional appearance of a sideways "Z" with an upper surface 32 and a lower surface 34.

For example, when using a 6"×12" beam that is 5½"× 11½" (top surface width by side surface width), the first cut is 4 inches wide by 1½ inches deep in the top surface along the total length of the beam and the second cut is 2½ inches wide by 4½ inches deep in the adjoining surface. This first cut leaves a rim-like projection 41 extending along the member, which projection forms a natural finish or protective surface for the edge and butt ends of decking 33 or sub-flooring 31. A plurality of notches 27b, each having substantially right-angled corners, are cut out of the newly-exposed edge thereof for floor joists 26 (shown in phantom) in FIG. 2. Opposed Face Beam 22a has similar dado cuts and notches therein, to present a "mirror image" when the two beams are set opposite one another.

Opposed Side Beams 24a, b are also engineered in a similar fashion, with two dado cuts milled along top and outside surfaces, as explained above (only Side Beam 24a shown in FIG. 2). When a floor joist 26 (seen in phantom in FIG. 2) is to join opposed Face Beam 22a, b, notches 27a, b (only 27b seen in FIG. 2) are cut at appropriate intervals into the surface newly-formed by dado cut 38. Three-dimensional sections equal to the outside dimensions of height, width and a prespecified length of the ends of joists 26 are removed, as by appropriate jigsaw cuts, at specified intervals from opposed beams to form notches 27 for the opposed ends of joists 26. Joists 26 can be used to support decking 33 or subflooring 31.

Also as shown in FIG. 2, corner junction 50 is formed by combining complementary faces of the ends of Face Beams 22 and Side Beams 24 (only 22b and 24a shown in FIG. 2). Two dado cuts, 61 and 63, are made with, for instance, a proper tool with skill known in the art, at predetermined sections at the end of Face Beam 22b, with cut 61 only going in partially and removing a section of wood the entire height of the beam, and cut 63 only going in partially and removing a section of wood the entire width of the beam, as shown. As can be seen at the end of Face Beam 22b, cut 61 is made therein to leave vertical face 68 and rim 41 extending past and around the end thereof, and cut 63 is made therein to leave vertical face 69 and lower horizontal face 65.

The joining faces, horizontal face 77 and vertical faces 78 and 79, of Side Beam 24a are made by first making, as with a jigsaw or other device, two orthogonal, vertical cuts 71 and 73, a predetermined distance partially through the end and a horizontal, or orthogonal, cut 75 to join therewith and removing the part of wood separated thereby. The ends of Face Beam 22b and Side Beam 24a are joined at corresponding faces 41—41, 68–78, 65–77, inner surface of Face Beam 22b–79, and inner surface of Side Beam 24a–69. "Corresponding faces 41—41" means that the face 41 of Face Beam 22b and the face 41 of Side Beam 24a confront each other when Face Beam 22b and Side Beam 24a are joined. Similarly, "68–78" means that face 68 and face 78 confront each other when the beams are joined, and so on.

Corner Posts 30 are engineered to provide, at the end joined to junction 50, a two-sided seat 80 for the combination of the ends of Face Beam and Side Beam 22b, 24a, respectively, to fit into. As seen in FIG. 2, an end of post 30 has a first cut made along a plane substantially parallel to a side thereof and into the end of the post a predetermined distance, a second cut made along a plane substantially parallel to the perpendicular side thereof and into the end of the post a predetermined distance, and a third cut made transversely to said first and second cuts, at the predetermined distance to separate a substantially cubical section of wood therefrom to form seat 80. The first cut provides vertical face 85 and the second cut provides vertical face 86 and the third cut provides horizontal face 87.

The combination of the vertical surfaces of dado cuts 39 of the ends of Face Beam 22b and Side Beam 24a are fittingly joined to corresponding vertical faces 86 and 85, respectively, of Post 30 and therefore prevent junction 50 from any degree of freedom in the horizontal direction. The combination of the horizontal surfaces of dado cuts 39 and lower surfaces 34 of the ends of Face Beam 22b and Side Beam 24a are fittingly joined to corresponding horizontal top faces 86 and 85, and face 87, respectively, of Post 30. Since the horizontal surfaces of dado cut 39 and lower surfaces 34 of Face Beam 22b and Side Beam 24a rest entirely on the horizontal cross-sectional area of Post 30, the joined horizontal faces 65–77 of Face Beam 22b and Side Beam 24a do not bear the weight of any load on junction 50, (thus a "load-bearing" surface is one that bears no load) nor on Deck 20. An aperture 88 is bored perpendicular to the upper surface of junction 50, through beams 22b and 24a and into face 87 and fastening means, such as a pin 36, inserted therein. If a sub-flooring 31 or decking 33 is to be installed (as shown in FIGS. 1 and 4), pin 36, and other fastening means (not shown in FIGS. 1 and 4) are used to secure it to frame 21. Also, as shown in phantom, a second-level Post 28, 30, 128, or 228 can be fitted, by making an inverse dado cut shape to two-sided seat formed by rim 41 to fittingly join the corresponding top surface of sub-flooring 31. By using the above-described construction, junction 50 is held together by the forces of gravity. In this way, the more weight added to Deck 20, the tighter and more secure, over and above the security built therein, it will be.

FIG. 3 shows an isolated and exploded view of a junction 100 taken from numeral III of FIG. 1. Junction 100 is formed by the combination of a Face or Side Post 28 and a Face Beam (not shown) or Side Beam such as 24a. At predetermined intervals, a square notch 105 is cut, as with a tool for making a dado cut or other similar means, from the underside of the beam, forming vertical faces of prespecified dimensions 109a and 109b and horizontal face 108. The end of post 28 that is to be joined into Side Beam 24a has a pair of opposed notches 112a and 112b cut therein to form vertical faces 114, 115, and 116 (only 114a, 115a, and 116a are shown in FIG. 3) and horizontal faces 113a and 113b (only 113a is shown in FIG. 3), and give the end of Post 28 a cross-sectional area shaped similarly to the letter "H". The combination of the vertical surfaces of dado cut 39, the vertical faces 109a and 109b and the inner surface of Side Beam 24a are fittingly joined to corresponding vertical faces 114, 116, and 115 respectively of Post 28 and thus preventing junction 100 from any degree of freedom in the horizontal direction. The combination of the horizontal surfaces of dado cut 39 and lower surface 34 of Side Beam 24a are fittingly joined to corresponding horizontal outside top surface of Post 28 and face 113 of Post 28 respectively. Since the horizontal surfaces of dado cut 39 and lower surface 34 of Side Beam 24a rest entirely on the cross-sectional area of Post 28, the joined horizontal faces 108–117 of Side Beam 24a and Post 28 do not bear the weight of any load on junction 100 of Deck 20. As at corner junction 50, an aperture is bored perpendicularly into the upper surface of the beam into the end of face 117 and fastening means, such as pin 36, inserted therein. If a sub-flooring 31 or decking 33 is to be installed (as shown in FIGS. 1 and 4), pin 36, and other fastening means (not shown in FIG. 1 and 4) are used to secure it to frame 21. Also, as shown in phantom, a second-level Post 28, 30, 128, or 228 can be fitted, by making an inverse dado cut shape to two-sided seat formed by rim 41 to fittingly join the corresponding surface of sub-flooring 31. The aperture is made through sub-flooring 31 and into the second-level post and pin 36 is inserted therethrough and therein. By using the above-described construction, junction 100 is held together by the force of gravity. In this way, the more weight added to Deck 20, the tighter and more secure, over and above the security built therein, it will be.

FIG. 4 is a perspective view of an alternate embodiment showing a one-level framed deck 120 (shown partially cut-away) having a Center Beam 122 for the purpose of supporting an increased load. Deck 120 has oppositely-facing Face Beams 22a,b joined and supported at their ends by corner junction 50 and Corner Post 30 to oppositely-facing Side Beams 24a,b (only Side Beam 24a is shown) and has interval junctions 100, all similar to deck 20, and can be covered by a subflooring 31 or decking 33 as shown in FIG. 1 (only 31 shown in FIG. 4, partially cut-away). Center Beam 122 is formed into a member with a cross-sectional shape substantially similar to the letter "T" by making dado cuts 139, similar to dado cuts 39 as explained above in FIG. 2, on opposite side faces along the length of the beam.

FIG. 5 shows an isolated and expanded perspective view, taken at numeral V, of junction 150 showing how the end of Center Beam 122 is joined with the top of Extension Post 128 and an intermediate section of a Face Beam or Side Beam (only Side Beam 24a is shown). Beam 24a, has, at prespecified intervals, a notch 127a cut in the edge formed by dado cut 38, by known techniques, to form vertical faces 125a, 126a, and 130a, and horizontal face 131a. Opposed Side Beam 24b has a similar notch 127b (only 127a is shown in FIG. 5) therein, to present a "mirror image" when the two beams are set opposite one another. When a Center Beam 122 is to join opposed Side Beams 24a,b, notches 127a,b are cut at appropriate intervals into the edges formed by dado cuts 38 to fittingly receive the ends of Center Beam 122. The ends of beam 122 have part of the stem of the "T", cut away, as with a dado cut or other means, from the underside of the beam to provide a vertical face 123a, a horizontal face 137a, and leave the horizontal face 136a. The end of Center Beam 122 and Side Beam 24a are joined at corresponding faces 136a-130a, 137a-131a, and the upper-outside faces of Center Beams 122–126a and 125a respectively.

Extension Posts 128 are engineered to provide, at the end joined to junction 150, a one-sided seat 134 for the combination of the Side Beam and Center Beam 24a, 122, respectively, to fit therein. As seen in FIG. 5, an end of Post 128 has a dado cut made along a plane substantially perpendicular to the sides thereof and into the end of the post a predetermined distance to remove a substantially cubical section of wood therefrom to form seat 134. This cut provides vertical face 135 and horizontal face 133. The combination of the vertical surfaces of dado cuts 39 of Side Beam 24a, fittingly joined to corresponding vertical face 135 of Post 128, and Face Beam 22b, fittingly joined to corresponding vertical face 86 of Post 30 (previously shown in FIG. 2), prevents junction 150 from any degree of freedom in the horizontal direction. The combination of the horizontal surface of dado cut 39, and lower surfaces 34 and 132 of Side Beam 24a and Center Beam 122 are fittingly joined to corresponding horizontal top faces of 135 and 133, respectively, of Post 128. Since the horizontal surface of dado cut 39 and lower surfaces 34 and 132 of Side Beam 24a and Center Beam 122 rest entirely on the horizontal cross-sectional area of Post 128, the joined horizontal faces 131a-137a of Side Beam 24a and Center Beam 122 do not bear the weight of any load on junction 150, nor on Deck 120. An aperture 88 is bored perpendicular to the upper surface of junction 150, through beams 122 and 24a and into face 133 and fastening means, such as a pin 36, inserted therein. If subflooring 31 or decking 33 is to be installed (as shown in FIGS. 1 and 4) pin 36, and other fastening means (not shown in FIGS. 1 and 4) are used to secure it to frame 121. Also, as shown in phantom, a second-level Post 28, 30, 128, or 228 can be fitted, by making an inverse dado cut shape to one-sided seat formed by rim 41 to fittingly join the corresponding top surface of sub-flooring 31. By using the above-described construction, junction 150 is held together by the forces of gravity. In this way, the more weight added to Deck 120, the tighter and more secure, over and above the security built therein, it will be.

Additionally, at specified intervals, Beam 122 has further dado notches 129 cut from the top side of the beam and at substantially right angles to its longitudinal dimension, to fittingly receive joists 26 (shown in phantom in FIG. 5).

FIG. 6, an isolated, expanded and perspective view taken at numeral VI from FIG. 4, shows a junction 200 where a Center Post 228 supportingly and fittingly meets the underside of Center Beam 122 at a position where a joist 26 (shown in phantom) is held in a notch 129. The end of post 228 that is to be joined to Center Beam 122 has a pre-engineered dado cut 234 made along a plane substantially perpendicular to the sides thereof and into the end of the post a predetermined distance, to remove a substantially rectangular section of wood exactly the width and thickness of the lower stem of the "T" of Center Beam 122. This cut provides vertical and horizontal surfaces 238, 239, and 235, respectively, and leaves horizontal surfaces 236 and 237. Post 228 is placed immediately below a predetermined notch 129. The outside surfaces of Center Beam 122, formed by dado cuts 139, and the surfaces of Post 228, formed by dado cut 234, are fittingly joined at corresponding faces 238 and 239—vertical surfaces of dado cuts 139, 236 and 237— horizontal surfaces of dado cuts 139, and 235-132. An aperture 88 is bored, in a perpendicular direction to junction 200, through joist 26, the stem of the "T" of Center Beam 122, and into horizontal surface 235 of Center Post 228. Fastening means, such as the combination of the vertical surfaces of dado cuts 139 of Center Beam 122 fittingly joined to corresponding vertical surfaces 238 and 239 of Center Post 228 and the combination of pin 36 fittingly joined into aperture 88 prevent junction 200 from any degree of freedom in the horizontal direction. When the subflooring 31 is installed, junction 200 is isolated from the surfaces above. Since the combination of the horizontal surfaces of dado cuts 139 and lower surface 132 of Center Beam 122 are fittingly joined to corresponding horizontal surfaces 236, 237, and 235, respectively, of Center Post 228, the joined horizontal faces of joist 26 and notch 129 do not bear the weight of any load on subflooring 31. The joined combination of aperture 88 and pin 36 may extend through subflooring 31 and into the bottom of a second level post 28, 30, 128 or 228. By using the above-described construction, junction 200 is held together by the forces of gravity. The more weight added to subflooring 31, and therefore Deck 120, the tighter and more secure, over and above the security built therein it will be.

It is understood that the above described embodiment is only one of those possible within the scope of the present invention. For instance, the bottom level posts used to support frame 21 can be either a cement foundation or individual anchoring sites. These and other changes may all be made within the spirit of the disclosure and the scope of the appended claims.

I claim:

1. A junction of frame members for supporting a load comprising:
    a) a single-piece horizontal member having a generally T-shaped cross-section, the horizontal member having a lower surface and a pair of vertical surfaces adjacent to the lower surface, and
    b) a post member, the post member having a generally rectangular cross-section, the post member having an end which is formed with a cut-out which defines a pair of vertical extensions and a horizontal seat portion, wherein the cut-out is in mating contact with the horizontal member, wherein the vertical extensions are in contact with the vertical surfaces, and wherein the lower surface of the horizontal member contacts the horizontal seat portion of the cut-out.

2. The junction of claim 1, wherein the horizontal member and the post member have apertures which are aligned with each other, and wherein there is a pin extending through both of said apertures.

3. The junction of claim 1, further comprising at least one joist, wherein the horizontal member has a plurality of dado cuts disposed along the horizontal member, the dado cuts being shaped to receive said at least one joist, wherein said at least one joist is perpendicular to the horizontal member and to the post member, wherein each said at least one joist has an aperture which is aligned with the apertures of the horizontal member and of the post member.

4. The junction of claim 3, further comprising a second-level post, the second-level post having an aperture aligned with the apertures of the horizontal member and of said at least one joist, wherein there is a pin extending through the aperture of the second-level post and extending into the aperture of the horizontal member.

5. A junction of frame members for supporting a load comprising:
    a) a horizontal member having a generally T-shaped cross-section, the horizontal member having a lower surface and a pair of vertical surfaces adjacent to the lower surface, and
    b) a post member, the post member having a generally rectangular cross-section, the post member having an end which is formed with a cut-out which defines a pair of vertical extensions and a horizontal seat portion, wherein the cut-out is in mating contact with the horizontal member, wherein the vertical extensions are in contact with the vertical surfaces, and wherein the lower surface of the horizontal member contacts the horizontal seat portion of the cut-out,
    wherein the horizontal member and the post member have apertures which are aligned with each other, and wherein there is a pin extending through both of said apertures.

* * * * *